United States Patent
Dong et al.

(10) Patent No.: US 10,834,737 B2
(45) Date of Patent: Nov. 10, 2020

(54) WIRELESS COMMUNICATION METHOD AND APPARATUS

(71) Applicant: Huawei Technologies Co., Ltd., Shenzhen (CN)

(72) Inventors: Pengpeng Dong, Shanghai (CN); Jinlin Peng, Shanghai (CN); Bai Du, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/460,804

(22) Filed: Jul. 2, 2019

(65) Prior Publication Data

US 2019/0327751 A1 Oct. 24, 2019

Related U.S. Application Data

(63) Continuation of application No. PCT/CN2018/000007, filed on Jan. 3, 2018.

(30) Foreign Application Priority Data

Jan. 3, 2017 (CN) .......................... 2017 1 0002667

(51) Int. Cl.
*H04W 72/12* (2009.01)
*H04W 72/04* (2009.01)

(52) U.S. Cl.
CPC ......... *H04W 72/12* (2013.01); *H04W 72/042* (2013.01); *H04W 72/044* (2013.01)

(58) Field of Classification Search
CPC .. H04W 72/12; H04W 72/042; H04W 72/044
See application file for complete search history.

(56) References Cited

U.S. PATENT DOCUMENTS

| | | | |
|---|---|---|---|
| 2004/0202319 A1 | 10/2004 | Hussain et al. | |
| 2018/0132237 A1* | 5/2018 | Sundararajan | .... H04W 72/0446 |

(Continued)

FOREIGN PATENT DOCUMENTS

| | | | | |
|---|---|---|---|---|
| CN | 101848402 A | | 9/2010 | |
| CN | 106162614 A | | 11/2016 | |
| CN | 108430106 A | * | 8/2018 | .......... H04W 72/042 |

OTHER PUBLICATIONS

English translation of Chinese patent publication CN108430106A, retrieved from the Internet on Jun. 29, 2020 (Year: 2020).*

(Continued)

*Primary Examiner* — Benjamin H Elliott, IV
(74) *Attorney, Agent, or Firm* — Slater Matsil, LLP

(57) ABSTRACT

A wireless communication method is provided, including: determining a scheduled first time-frequency resource, where the first time-frequency resource is scheduled for a transmit end to send first data, and a re-allocated time-frequency resource in the first time-frequency resource is scheduled to send second data; sending, by the transmit end, the second data on the re-allocated time-frequency resource, and sending a part of the first data on a remaining first time-frequency resource other than the re-allocated time-frequency resource; and sending, by the transmit end, a remaining part of the first data that is not sent due to occupation by the second data, by using a supplementary-transmission time-frequency resource that is determined based on the re-allocated time-frequency resource and that is in a second time-frequency resource.

20 Claims, 10 Drawing Sheets

(56) References Cited

U.S. PATENT DOCUMENTS

| | | | | |
|---|---|---|---|---|
| 2019/0173623 A1* | 6/2019 | Khosravirad | ......... | H04L 1/1896 |
| 2019/0222362 A1* | 7/2019 | Beale | .................... | H04L 5/0064 |
| 2019/0280841 A1* | 9/2019 | Fu | ..................... | H04W 72/1289 |
| 2019/0327751 A1* | 10/2019 | Dong | .................... | H04L 5/0044 |
| 2020/0187225 A1* | 6/2020 | Xia | .......................... | H04L 1/18 |

OTHER PUBLICATIONS

International Search Report for PCT/CN2018/000007; Apr. 27, 2018 (Year: 2018).*
3GPP TSG RAN WG1 Meeting #87 R1-1611222 Reno, USA Nov. 14-16, 2016; Huawei, HiSilicon (Year: 2016).*
3GPP TSG RAN WG1 Meeting #87 R1-1611367 Reno, NV, USA, Nov. 14-18, 2016; CATT (Year: 2016).*
3GPP TSG RAN WG1 Meeting #87 R1-1611545 Lisbon, Portugal Oct. 10-14, 2016; Sony (Year: 2016).*
3GPP TSG-RAN WG1 Meeting #86bis R1-1608957 Lisbon, Portugal Oct. 10-14, 2016; ZTE (Year: 2016).*
3GPP TSG RAN WG1 Meeting #87 R1-1611849 Reno, USA, Nov. 14-18, 2016; LG Electronics (Year: 2016).*
3GPP TSG RAN WG1 Meeting #87 R1-1612003 Reno, USA, Nov. 14-18, 2016; Intel (Year: 2016).*
Huawei, HiSilicon, DL URLLC multiplexing considerations, 3GPP TSG RAN WG1 Meeting #87 Reno, USA Nov. 14-18, 2016, R1-1611222, 8 pages.
ZTE, ZTE Microelectronics, Multiplexing of eMBB and URLLC, 3GPP TSG RAN WG1 Meeting #86 Gothenburg, Sweden, Aug. 22-26, 2016, R1-166408, 10 pages.
Huawei, HiSilicon, Overview of URLLC support in NR, 3GPP TSG RAN WG1 Meeting #86bis Lisbon, Portugal, Oct. 10-14, 2016, R1-1608843, 7 pages.

* cited by examiner

WIRELESS COMMUNICATION METHOD AND APPARATUS

CROSS-REFERENCE TO RELATED APPLICATIONS

This application is a continuation of International Application No. PCT/CN2018/000007, filed on Jan. 3, 2018, which claims priority to Chinese Patent Application No. 201710002667.9, filed on Jan. 3, 2017 The disclosures of the aforementioned applications are hereby incorporated by reference in their entireties

TECHNICAL FIELD

Embodiments of the present invention relate to the communications field, and more specifically, to a wireless communication method and apparatus.

BACKGROUND

At present, according to a requirement of the International Telecommunication Union (ITU) on a future communications system, an air interface in the future communications system supports various services, such as an enhanced mobile broadband (eMBB) service, an ultra-reliable low-latency communication (URLLC) service, and a massive machine type communications (Massive MTC) service.

The eMBB service mainly includes an ultra-high-definition video, augmented reality AR, virtual reality VR, and the like, and features a large volume of data transmission and a quite high transmission rate. The URLLC service is mainly applied to industrial control, unmanned driving, and the like in the Internet of Things, and features ultra-high reliability, a low latency, a relatively small volume of data transmission, and burstiness. The mMTC service is mainly applied to smart grid, smart city, and the like in the Internet of Things, and features connection between massive devices, a small data transmission amount, and tolerance of a relatively high latency.

The different services raise different requirements on the communications system. Some services have a relatively high latency requirement, and some services have a relatively low latency requirement. In a technical solution, a network device in a long term evolution (LTE) communications system may send a downlink control channel to a terminal device, to schedule the terminal device to receive, on a time-frequency resource indicated by the downlink control channel, a downlink message of a current service on the terminal device.

To meet a transmission requirement of a service having a relatively high latency requirement, the following solution may be considered: After scheduling a terminal device whose current service has a lower latency requirement to receive a message, the network device allocates a time-frequency resource allocated based on a downlink control channel to the terminal device whose service has a lower latency requirement, to a terminal device whose service has a higher latency requirement.

However, in this solution, the terminal device whose service has a lower latency requirement still receives data on the re-allocated time-frequency resource (for example, demodulates or decodes data on the re-allocated time-frequency resource), resulting in a performance loss.

For example, the URLLC service raises an extremely high latency requirement. When there is no reliability requirement, a latency needs to be within 0.5 ms. With a requirement of 99.999% reliability, a latency still needs to be within 1 ms. To meet such a strict latency requirement, a shorter scheduling unit, for example, a mini-slot, is used, that is, one or more OFDM symbols are used as a scheduling unit, and a total OFDM symbol length of the scheduling unit is less than a length of one slot. For another example, for a slot with a large subcarrier spacing, for example, a subcarrier spacing of 60 kHz, one slot includes seven OFDM symbols and has a time length of only 0.125 ms. The eMBB service still uses a relatively long scheduling unit, for example, a slot, because the eMBB service requires a high rate and a large amount of data. In addition, the URLLC service is generated occasionally in a burst mode. When URLLC service data randomly arrives at a mobile communications network, because of the strict latency requirement, the URLLC service data cannot wait for transmission of eMBB service data that is being scheduled to be completed. Therefore, "preemption" becomes a major solution in this scenario. Preemption means that a base station is allowed to allocate a resource used for URLLC onto a time-frequency resource that has been allocated to eMBB service data, to send the URLLC resource.

SUMMARY

Embodiments of the present invention provide a wireless communication method, a wireless communications apparatus (transmit end), and a corresponding wireless communications apparatus (receive end), to reduce a reception performance loss of a terminal device caused by resource re-allocation.

A wireless communication method is provided, including: determining a scheduled first time-frequency resource, where the first time-frequency resource is scheduled for a transmit end to send first data, and a re-allocated time-frequency resource in the first time-frequency resource is scheduled to send second data; sending, by the transmit end, the second data on the re-allocated time-frequency resource, and sending a part of the first data on a remaining first time-frequency resource other than the re-allocated time-frequency resource; and sending, by the transmit end, a remaining part of the first data that is not sent due to occupation by the second data, by using a supplementary-transmission time-frequency resource, determined based on the re-allocated time-frequency resource, in a second time-frequency resource.

Correspondingly, a corresponding wireless communication method is provided at a received end, including: determining a scheduled first time-frequency resource, where the first time-frequency resource is scheduled for a transmit end to send first data, and a re-allocated time-frequency resource in the first time-frequency resource is scheduled to send second data; receiving, by the receive end, a part of the first data on the first time-frequency resource; receiving, by the receive end, a remaining part of the first data on a supplementary-transmission time-frequency resource determined based on the re-allocated time-frequency resource; and processing, by the receive end, the first data based on the re-allocated time-frequency resource and the supplementary-transmission time-frequency resource.

Adaptively, an embodiment of the present invention further provides a wireless communications apparatus that is configured to or may perform the foregoing methods. According to the foregoing solutions, a possibility of correctly receiving wireless communication data can be increased. Further, reception performance can be improved through fewer indication resources.

BRIEF DESCRIPTION OF THE DRAWINGS

To describe the technical solutions in the embodiments of the present invention, the following briefly describes the accompanying drawings for describing the embodiments.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention.

A terminal device in the embodiments of the present invention may be a device that provides voice and/or data connectivity for a terminal device, a handheld device with a wireless connection function, or another processing device connected to a wireless modem. The wireless terminal may communicate with one or more core networks through a radio access network (RAN). The wireless terminal may be a mobile terminal, for example, a mobile phone (or referred to as a "cellular" phone) and a computer with a mobile terminal, for example, a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal device may also be referred to as a system, a subscriber unit, a subscriber station, a mobile station, a mobile console (Mobile), a remote station, an access point, a remote terminal, an access terminal, a user terminal, a user agent, a user device, or user equipment.

A network device in the embodiments of the present invention may be a base station or an access point, or may be a device that communicates with a wireless terminal through one or more sectors over an air interface in an access network. The base station may be configured to perform mutual conversion between a received over-the-air frame and an IP packet and serve as a router between the wireless terminal and a remaining part of the access network, where the remaining part of the access network may include an Internet protocol (IP) network. The base station may further coordinate attribute management on the air interface. For example, the base station may be a base transceiver station (BTS) in GSM or CDMA, a NodeB (NodeB) in WCDMA, or an evolved NodeB (evolutional Node, BeNB or e-NodeB) in LTE. This is not limited in this application.

A wireless communication method provided in the embodiments of the present invention is applicable to a terminal device that has a relatively low latency requirement on message sending or reception in any wireless communications system, and a network device that schedules the terminal device to send a message or receive a message. The wireless communications system herein may be, for example, an LTE communications system, a 4G communications system, or a 5G communications system.

Figure 1A:
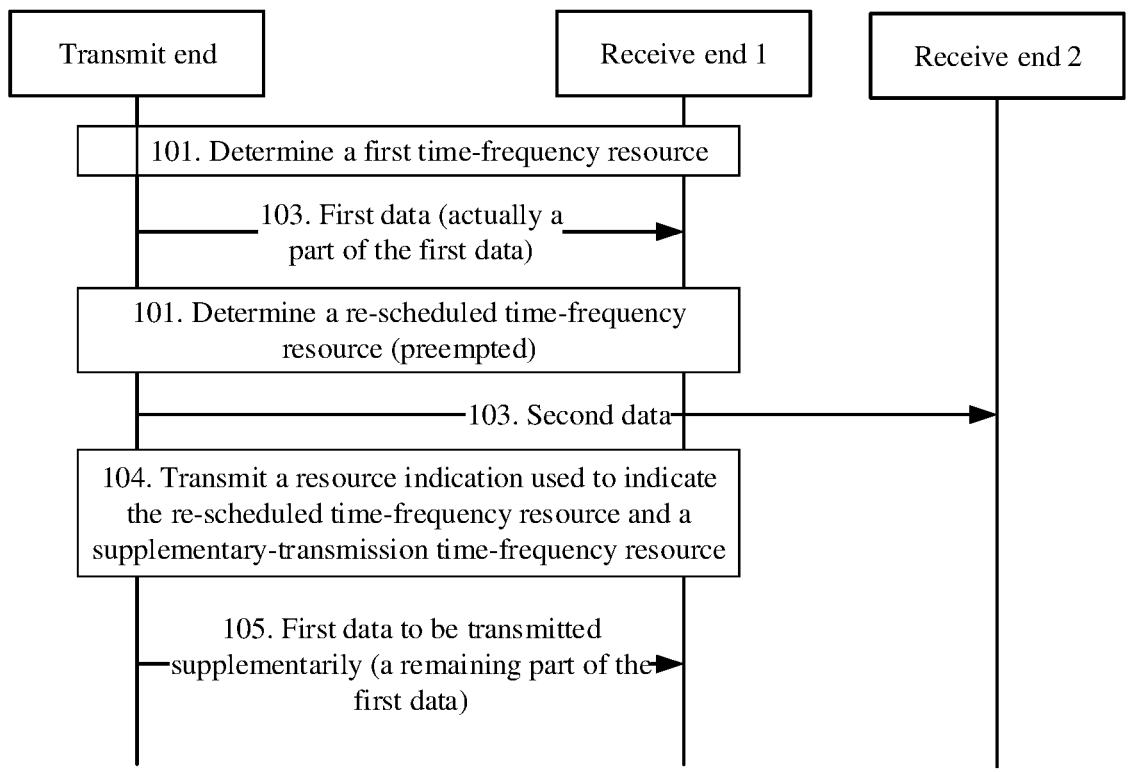
FIG. 1A is a simplified schematic diagram of a process at a transmit end according to an embodiment of the present invention.

Referring to FIG. 1A, an embodiment of the present invention provides a wireless communication method. The method is usually applied to downlink transmission, but there is no limitation on application to uplink transmission in this implementation. FIG. 1A shows a plurality of receive ends, for example, a receive end 1 and a receive end 2. However, the receive end 1 and the receive end 2 are not necessarily physically separated entities, but may be different virtual entities located on a same physical entity. The method includes the following steps.

101. Determine a scheduled first time-frequency resource, where the first time-frequency resource is scheduled for a transmit end to send first data, and a re-allocated time-frequency resource in the first time-frequency resource is scheduled to send second data.

Specifically, if the transmit end is a base station (downlink transmission), after the first time-frequency resource and the re-allocated time-frequency resource are determined (step 101), the method includes at least step iota of sending an indication of the first time-frequency resource;

If the transmit end is a terminal (uplink transmission), the method includes step 102*b* of receiving an indication of the first time-frequency resource, so as to determine the scheduled first time-frequency resource based on the indication of the first time-frequency resource (step 101).

103. The transmit end sends the second data on the re-allocated time-frequency resource, and sends a part of the first data on a remaining first time-frequency resource other than the re-allocated time-frequency resource. Specifically, because a part of the time-frequency resource originally scheduled for the first data is preempted, in normal cases, only a part of the first data that should have been all mapped onto the first time-frequency resource can be sent, and the part of the first data is the part that can be mapped onto the remaining first time-frequency resource.

There may be a plurality of specific mapping modes. For example, the to-be-sent first data is continuously mapped onto the remaining first time-frequency resource based on the remaining first time-frequency resource. In this case, remaining first data that cannot be mapped or sent is located at an end of the foregoing first data.

Alternatively, the to-be-sent first data is mapped onto the remaining first time-frequency resource based on an originally scheduled resource mapping location, but the second data is mapped onto the re-allocated time-frequency resource. In this case, a corresponding part of the original first data in the re-allocated time-frequency resource is skipped. As a result, the remaining first data that cannot be mapped or sent is located at a corresponding part of the foregoing first data, for example, a middle part.

It should be noted that step 103 illustrates only a mapping relationship between a time-frequency resource and corresponding data, and does not describe a logical sequence between the sending steps.

It should be noted that terms such as re-allocate, preempt, and occupy that are mentioned in implementations describe same technical content from different perspectives, that is, a part of the first time-frequency resource is re-allocated based on a service situation, for use by the second data. The descriptions in this specification are interchangeable.

105. The transmit end sends a remaining part of the first data that is not sent due to occupation by the second data, by using a supplementary-transmission time-frequency resource, determined based on the re-allocated time-frequency resource, in a second time-frequency resource.

It should be noted that, there may be a plurality of technical solutions for the foregoing process of sending the remaining part of the first data that is not sent due to occupation by the second data. From a result, at least a part of the remaining part of the first data that is not sent due to occupation by the second data is sent. Specifically, in some examples, as shown in subsequent FIG. 2A, FIG. 2B, FIG. 2C, or FIG. 2D, the remaining part of the first data that is not sent due to occupation by the second data can be mapped onto and sent on exactly the supplementary-transmission time-frequency resource; in some other examples, as shown in FIG. 2E, on a coarse-grained supplementary-transmission time-frequency resource, a part of the first data that has been sent on the first time-frequency resource previously may also be sent. In solutions shown in FIG. 3 and FIG. 4, rate matching is performed, based on a data structure of the supplementary-transmission time-frequency resource, on the remaining part of the first data that is not sent due to occupation by the second data. In this way, actually sent data is usually less than the remaining part of the first data that is not sent due to occupation by the second data.

Specifically, the second data is data with a latency requirement higher than that of the first data, and details are not described herein.

Further, based on the foregoing sending method, and in particular, the resource mapping method, the method further includes the following steps.

104. Transmit a resource indication used to indicate the re-allocated time-frequency resource and the supplementary-transmission time-frequency resource. Specifically, if the transmit end is a base station, step 104a of sending the resource indication is performed; or if the transmit end is a terminal, step 104b of receiving the resource indication is performed. A sequence between step 104 and another step is not limited in this implementation of the present invention.

More specifically, the resource indication has a function of indicating both the two types of information. For example, a specific manner is as follows.

In step 1041, a first resource indication used to explicitly indicate the re-allocated time-frequency resource is transmitted, where the first resource indication is used to implicitly indicate the supplementary-transmission time-frequency resource; or in step 1042, a second resource indication used to explicitly indicate the supplementary-transmission time-frequency resource is transmitted, where the second resource indication is used to implicitly indicate the re-allocated time-frequency resource. Details of the resource indication are described in the following implementations, and details are not described herein.

According to the foregoing solutions of supplementary transmission or retransmission and an implicit resource indication, information resources used by notification information are saved to some extent, improving system performance.

In an optional implementation, the supplementary-transmission time-frequency resource determined based on the re-allocated time-frequency resource includes the following:

(1) Same location: A frequency-domain relative start location Ks of the re-allocated time-frequency resource in the first time-frequency resource Ks is the same as a frequency-domain relative start location Ks+t of the supplementary-transmission time-frequency resource in the second time-frequency resource; and/or a time-domain relative start location Ls of the re-allocated time-frequency resource in the first time-frequency resource is the same as a time-domain relative start location Ls+t of the supplementary-transmission time-frequency resource in the second time-frequency resource.

Alternatively, (2) correlated location: There is an offset between a frequency-domain relative start location of the re-allocated time-frequency resource in the first time-frequency resource and a frequency-domain relative start location of the supplementary-transmission time-frequency resource in the second time-frequency resource; and/or there is an offset between a time-domain relative start location of the re-allocated time-frequency resource in the first time-frequency resource and a time-domain relative start location of the supplementary-transmission time-frequency resource in the second time-frequency resource, where $\Delta k \neq 0$ or $\Delta l \neq 0$. The following describes in detail frequency-domain and time-domain resources or resource elements of the frequency-domain and time-domain resources, and details are not described herein.

Moreover, in addition to the foregoing relationship between the relative start locations, there may also be a quantity relationship between the supplementary-transmission time-frequency resource and the re-allocated time-frequency resource: (3) The supplementary-transmission time-frequency resource and the re-allocated time-frequency resource occupy a same quantity of time-domain resource elements; or (4) the supplementary-transmission time-frequency resource and the re-allocated time-frequency resource occupy a same quantity or different quantities of frequency-domain resource elements.

Specifically, in a solution in which (1) same location is used, the first resource indication in step 1041 includes information that explicitly indicates the re-allocated time-frequency resource, and the second resource indication in step 1042 information that explicitly indicates the supplementary-transmission time-frequency resource.

Specifically, in the first resource indication or the second resource indication, information about a frequency-domain resource includes a start location and a quantity of allocated frequency domain elements, or a frequency-domain element number, and information about a time-domain resource includes a time-domain element number, for example, an OFDM symbol number, a mini-slot number, or a slot number.

In a solution in which (2) correlated location is used, the first resource indication in step 1041 includes not only information that explicitly indicates the re-allocated time-frequency resource and information that explicitly indicates the supplementary-transmission time-frequency resource, but also an indication of the frequency-domain offset $\Delta k$ and/or the time-domain offset $\Delta l$ of the supplementary-transmission time-frequency resource relative to the re-allocated time-frequency resource; and the second resource indication in step 1042 includes not only information that explicitly indicates the re-allocated time-frequency resource and information that explicitly indicates the supplementary-transmission time-frequency resource, but also an indication of the frequency-domain offset Δk and/or the time-domain offset Δl of the re-allocated time-frequency resource relative to the supplementary-transmission time-frequency resource. The frequency-domain offset is expressed in a resource block (RB), a resource block group RBG, a resource element (RE), a subband subband, or the like. The foregoing time-domain symbol may be an OFDM symbol or an SCFDMA symbol. The time-domain offset is expressed in an OFDM symbol, a mini-slot, a slot, or the like. The foregoing solution relates to only content of the indication, and does not limit a specific data structure of the indication.

Figure 1B:
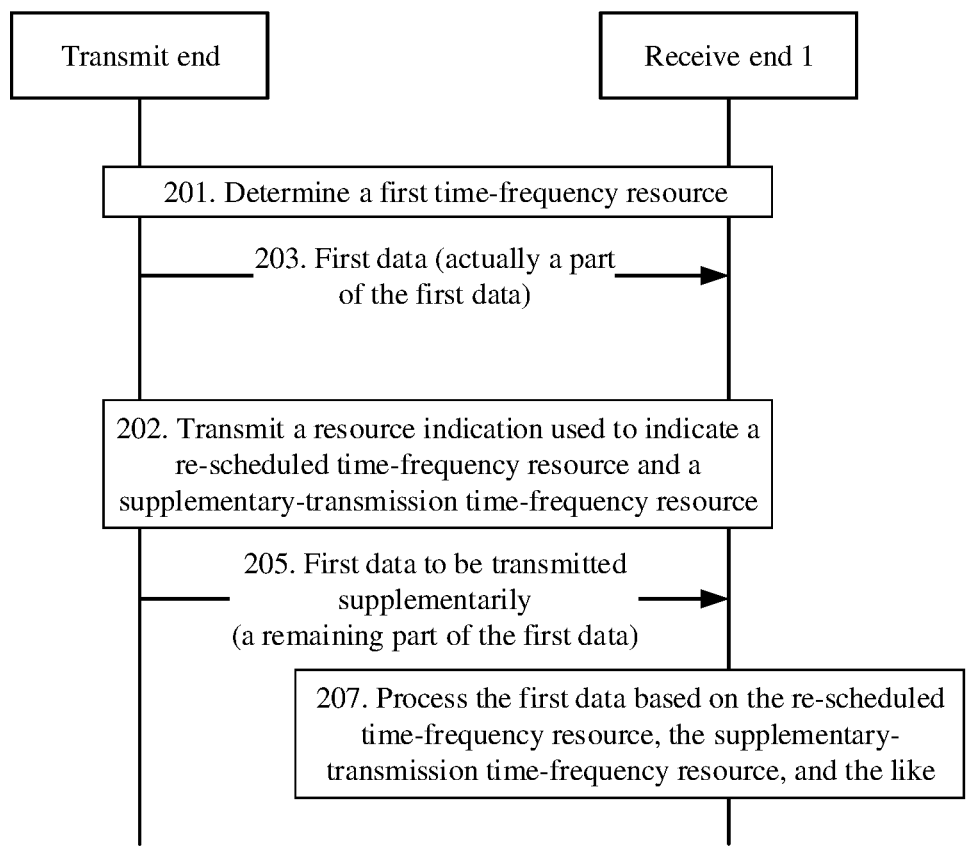
FIG. 1B is a simplified schematic diagram of a process at a receive end according to an embodiment of the present invention.

Correspondingly, referring to FIG. 1B, a corresponding wireless communication method at a receive end is provided, mainly from a perspective of a receive end 1 that receives first data. The receive end 1 and a receive end 2 are not necessarily physically separated entities, but may be different virtual entities located on a same physical entity. The method includes the following steps.

A wireless communication method is provided, and the method includes the following steps.

201. Determine a scheduled first time-frequency resource, where the first time-frequency resource is scheduled for a transmit end to send first data, and a re-allocated time-frequency resource in the first time-frequency resource is scheduled to send second data.

Specifically, if the receive end is a terminal (downlink transmission), an indication of the first time-frequency resource is received in step 102b, and the scheduled first time-frequency resource is determined based on the indication of the first time-frequency resource (101), so that data or information is subsequently received on the time-frequency resource.

If the receive end is a base station (uplink transmission), the scheduled first time-frequency resource is determined (scheduling is performed in step 101), so that data or information is subsequently received on the time-frequency resource.

203. The receive end receives a part of the first data on the first time-frequency resource.

205. The receive end receives a remaining part of the first data on a supplementary-transmission time-frequency resource determined based on the re-allocated time-frequency resource.

207. The receive end processes the first data based on the re-allocated time-frequency resource and the supplementary-transmission time-frequency resource.

Further, the method further includes the following step:

202. Transmit a resource indication used to indicate the re-allocated time-frequency resource and the supplementary-transmission time-frequency resource, and the receive end obtains the re-allocated time-frequency resource and the supplementary-transmission time-frequency resource based on the resource indication. Specifically, if the receive end is a terminal (downlink transmission), the receive end receives the resource indication; or if the receive end is a base station (uplink transmission), the receive end sends the resource indication, so that a terminal sends data or information. A sequence between step 202 and another step is not limited in this embodiment of the present invention.

Specifically, a first resource indication used to explicitly indicate the re-allocated time-frequency resource is transmitted, where the first resource indication is used to implicitly indicate the supplementary-transmission time-frequency resource; and the re-allocated time-frequency resource is obtained based on the first resource indication, and the supplementary-transmission time-frequency resource is obtained based on the first resource indication.

Alternatively, a second resource indication used to explicitly indicate the supplementary-transmission time-frequency resource is transmitted, where the second resource indication is used to implicitly indicate the re-allocated time-frequency resource; and the supplementary-transmission time-frequency resource is obtained based on the second resource indication, and the re-allocated time-frequency resource is obtained based on the second resource indication.

According to the foregoing solutions of supplementary transmission or retransmission and an implicit resource indication, information resources used by notification information are saved to some extent, improving system performance.

Description of the supplementary-transmission time-frequency resource determined based on the re-allocated time-frequency resource is the same as that at the transmit end, and details are not described herein again.

More specifically, that the receive end processes the first data based on the re-allocated time-frequency resource and the supplementary-transmission time-frequency resource includes: deleting, by the receive end, soft information demodulated on the re-allocated time-frequency resource from soft information demodulated on the first time-frequency resource, and decoding the first data in combination with soft information demodulated on the supplementary-transmission time-frequency resource; or directly decoding a combination of soft information demodulated on the first time-frequency resource and soft information demodulated on the supplementary-transmission time-frequency resource, instead of deleting the soft information demodulated on the first time-frequency resource. A specific processing manner is not limited in each implementation, provided that decoding performance is improved to some extent.

Figure 1C:
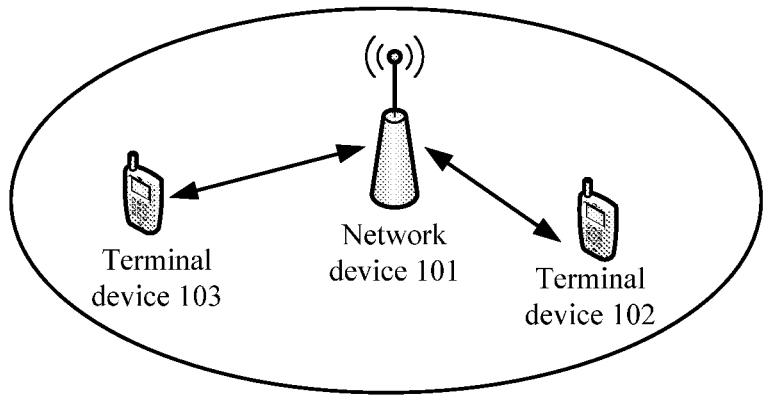
FIG. 1C is a schematic diagram of an application scenario according to an embodiment of the present invention.

In the following, downlink data in an LTE communications system is used as an example. In a technical solution, as shown in FIG. 1C, after a network device 101 schedules, by using a downlink control channel, a terminal device 102 whose current service has a lower latency requirement to receive downlink data sent by the network device 101, if the network device 101 also needs to schedule a terminal device 103 whose current service has a higher latency requirement to receive the downlink data sent by the network device 101, the network device 101 may send the downlink data on a time-frequency resource allocated to the terminal device 102. However, when the network device 101 sends the downlink data to the terminal device 103 on the time-frequency resource allocated to the terminal device 102, the terminal device 102 suffers a performance loss.

In the following examples, eMBB is used as an example for a service with a low latency requirement, and URLLC is used as an example for a service with a high latency requirement. After scheduling a time-frequency resource to send eMBB data, a transmit end schedules a part of the time-frequency resource that has been allocated or scheduled, to send URLLC data. The following is described by using eMBB and URLLC as examples. A person skilled in the art shall be aware that technical solutions may also be applied to other services with a low latency requirement and other services with a high latency requirement.

Specifically, a time-frequency resource in this embodiment of the present invention includes a frequency-domain resource or a time-domain resource. The frequency-domain resource may be expressed in a standard-specified resource element RE, and the time-domain resource may be expressed in a standard-specified time-domain scheduling unit. For example, one time-domain scheduling unit may include one subframe (for example, 14 symbols). For another example, one time-domain scheduling unit may include one slot (seven symbols). For still another example, one time-domain scheduling unit may include one or more mini-slots. A mini-slot may include less than seven symbols, for example, two symbols.

The wireless communication method provided in this embodiment of the present invention is intended to resolve a problem that a terminal device with a relatively low latency requirement suffers a performance loss due to resource re-allocation in the technical solution. Specific embodiments are used in the following to describe in detail the technical solutions of the present invention. The following specific embodiments may be combined, and same or similar concepts or processes may be not repeated in some embodiments.

First, some concepts mentioned in the embodiments of the present invention are described.

Based on the technical solution shown in FIG. 1A, for eMBB data that has been scheduled but cannot be normally sent due to puncturing or occupation by URLLC data, decoding efficiency is usually relatively low at the receive end. Therefore, a technical solution is proposed to perform supplementary transmission on the eMBB data that is not normally sent, or in other words, retransmit occupied eMBB data, and notify the receive end of location information of the occupied resource, so that the receive end performs necessary HARQ erasure and combining operations to improve the overall decoding efficiency.

At present, in some rough solutions, supplementary transmission (or retransmission) of data that is not sent because a time-frequency resource is occupied by another service may be immediately performed before an ACK/a NACK is received, or may be performed after an ACK/a NACK is received; and location information of the occupied resource may be notified through pre-scheduling, before URLLC data is sent, when URLLC data is being sent, or at a next scheduling time. In addition, the resource location information may be notified explicitly or implicitly.

To further improve decoding efficiency of a common terminal, the following implementations provide a method for supplementarily transmitting (retransmitting) data that is not sent because a time-frequency resource is occupied by another service, based on diagrams of a time-frequency resource.

Implementation 1:

Mode in which data to be transmitted supplementarily is embedded into data of a next scheduling unit at a current receive end.

In schematic diagrams of a data structure shown in FIG. 2A to FIG. 2E, an eMBB slot (for example, the $s^{th}$ slot) sent to a common terminal 102 includes an eMBB control (eMBB control) field, an eMBB data (eMBB data) field, and a URLLC mini-slot (URLLC mini-slot). The URLLC mini-slot further includes a URLLC control (URLLC control) field and a URLLC data (URLLC data) field. Certainly, the URLLC control field may also be referred to as a PDCCH corresponding to a mini-slot, or a mini-PDCCH for short.

A subsequent eMBB slot (for example, the $(s+t)^{th}$ slot) sent to the common terminal 102 includes an eMBB control (eMBB control) field and an eMBB data (eMBB data) field. For the eMBB data in the $(s+t)^{th}$ slot, on a time-frequency resource whose relative location is the same as or correlated to (or whose relative shape is the same as) that of the URLLC mini-slot in the $s^{th}$ slot, eMBB data in the $s^{th}$ slot that cannot be sent because of the URLLC mini-slot is transmitted.

An eMBB slot, an eMBB slot s+t, the URLLC mini-slot, and the eMBB data in the $(s+t)^{th}$ slot in the data structures shown in the FIG. 2A to FIG. 2E are examples of the first time-frequency resource, the second time-frequency resource, the re-allocated time-frequency resource (or referred to as a preempted time-frequency resource), and the supplementary-transmission (or retransmission) time-frequency resource in 101 to 105 or 201 to 207 in the foregoing methods, respectively. This implementation of the present invention is not limited to the foregoing data structures. For example, both the eMBB data and the URLLC data use a large-subcarrier-spacing (for example, 60 kHz) slot, where the URLLC occupies one slot, while the eMBB data is carried on a plurality of slots (or referred to as a slot aggregation). In this case, the eMBB slot in FIG. 2A to FIG. 2E may be replaced with the eMBB slot aggregation, and the URLLC mini-slot may be replaced with one slot, and other information is adaptively adjusted.

The foregoing structure is only used as an example in the following implementations, and other data structures may be adaptively adjusted. Details are not described herein.

Specifically, the foregoing time-frequency resources with the same or correlated relative locations (or with the same relative shapes) mean that a distance K between a start location of the URLLC mini-slot in the slot s in entire frequency domain and a start location of the slot s in entire frequency domain is the same as a distance $K_{s+t}$ between a start location of a supplementary-transmission eMBB resource block in the slot s+t in entire frequency domain and a start location of the slot s+t in entire frequency domain, and the URLLC mini-slot and the retransmission eMBB resource block occupy a same quantity of or different quantities of REs. In brief, the frequency-domain relative start location of the URLLC mini-slot in the slot s is the same as the frequency-domain relative start location of the supplementary-transmission eMBB resource block in the slot s+t.

A distance $L_s$ between a time-domain start location of the URLLC mini-slot in the slot s and a time-domain start location of the slot s is the same as a distance $L_{s+t}$ between a time-domain start location of the supplementary-transmission eMBB resource block in the slot s+t and a time-domain start location of the slot s+t, and the URLLC mini-slot and the supplementary-transmission eMBB resource block occupy a same quantity of time-domain scheduling units, for example, two symbols. In brief, the time-domain relative start location of the URLLC mini-slot in the slot s is the same as the time-domain relative start location of the supplementary-transmission eMBB resource block in the slot s+t. As shown in FIG. 2A to FIG. 2E, the frequency-domain relative distance $K_s$ is the same as the frequency-domain relative distance $K_{s+t}$, and the time-domain relative distance $L_s$ is the same as the time-domain relative distance $L_{s+t}$.

Compared with the solution in which the relative locations are the "same", that the relative locations are "correlated" means that there is an offset between the frequency-domain relative distance $K_s$ and the frequency-domain relative distance $K_{s+t}$, and that there is an offset between the time-domain relative distance $L_s$ and the time-domain relative distance $L_{s+t}$.

Generally, the solution in which the relative locations are the same can save some indication resources as much as possible, but for the second time-frequency resource, a supplementary-transmission time-frequency resource may need to be available. If there is control information on the supplementary-transmission time-frequency resource, or the supplementary-transmission time-frequency resource is unavailable due to other reasons, the supplementary-transmission time-frequency resource cannot be used as the second time-frequency resource. In this case, a later slot needs to be scheduled as the second time-frequency resource, and this is described by using an example in the following.

In a specific implementation process, there may be different specific scheduling solutions or situations. Details are described in the following.

Figure 2A:
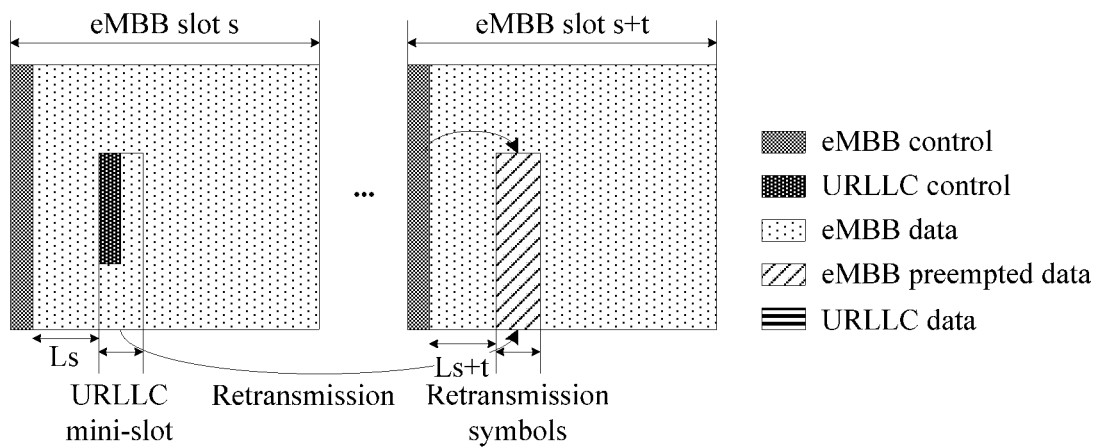
FIG. 2A, FIG. 2B, FIG. 2C, FIG. 2D or FIG. 2E is a simplified schematic diagram of a data structure according to an embodiment of the present invention.

FIG. 2A shows eMBB intra-frequency scheduling.

To be specific, eMBB transmission data of a terminal device (or referred to as a user) is scheduled onto a same frequency-domain resource in different slots.

Figure 2B:
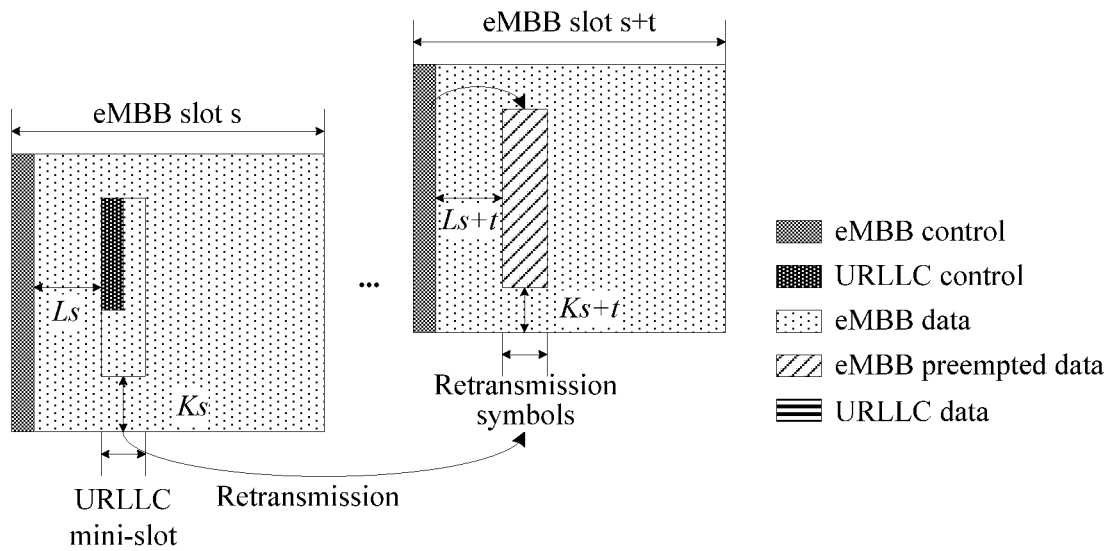

In example 2, FIG. 2B shows eMBB frequency selective scheduling.

In the eMBB frequency selective scheduling mode, transmission data of a terminal device (or referred to as a user) may be scheduled onto different frequency-domain resources in different slots. As shown in FIG. 2B, a frequency-domain resource in the slot s+t is different from that in the slot s. In this implementation of the present invention, a time-frequency relative location (or a shape) of supplementarily transmitted (retransmitted) eMBB data within a normally scheduled eMBB slot is the same as that in a previously punctured URLLC mini-slot. For a meaning of this, refer to FIG. 2B and the foregoing descriptions about the same or correlated locations.

Figure 2C:
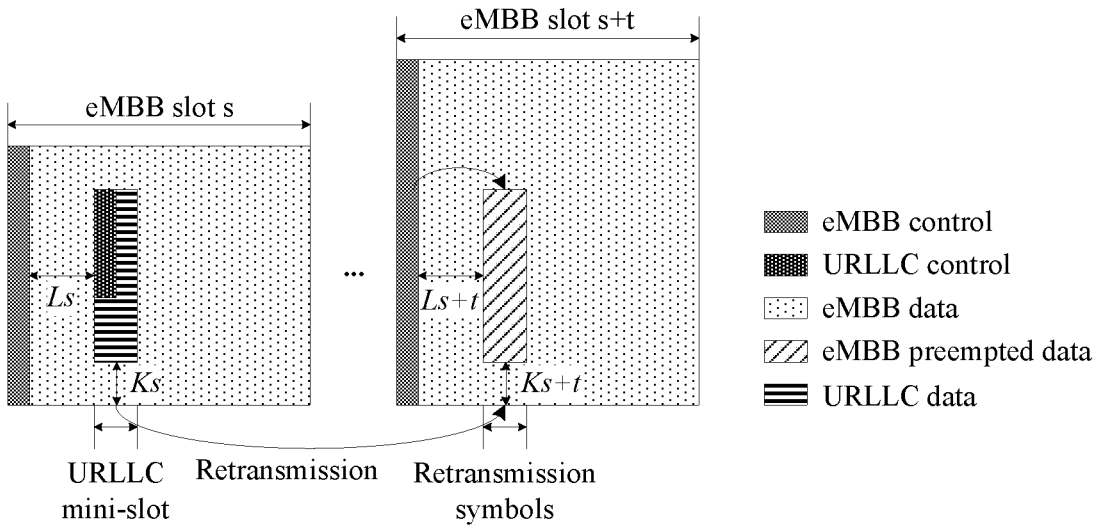

In example 3, FIG. 2C shows adaptive eMBB scheduling.

In the adaptive eMBB scheduling mode, at different eMBB transmission time points, sizes of scheduled frequency-domain resources may differ. Even for supplementarily transmitted (retransmitted) data in an eMBB process, sizes of frequency-domain resources used during retransmission may also differ if adaptive HARQ is used. In this case, time-domain relative locations may also maintain the same, starting from a frequency-domain start location of the eMBB service.

In the mode shown in FIG. 2C, an eMBB control channel in the eMBB slot s+t indicates a time-frequency resource in which the supplementarily transmitted (retransmitted) data is located.

In example 4, there is an offset between a supplementary-transmission (retransmission) location and a re-allocated location.

Figure 2D:
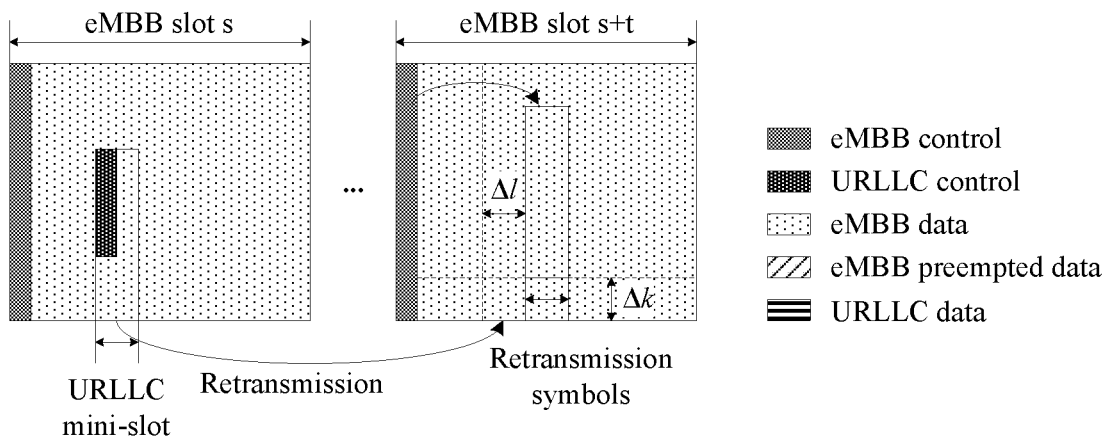
Figure 2E:
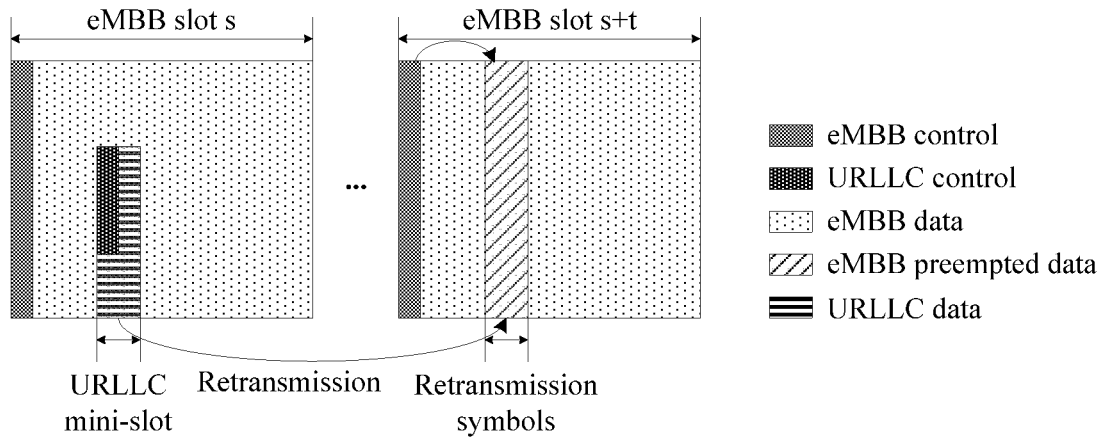

Referring to FIG. 2D, in some cases, it may be difficult to maintain the retransmission location to be the same as the re-allocated location. For example, the time-frequency resource that needs to be retransmitted may be preempted by another URLLC, or the time-frequency resource is located in a pilot channel, a control channel, a broadcast channel, or the like (which usually cannot be preempted) of eMBB. To avoid this, shifting may be performed based on a frequency-domain relative distance and a time-domain relative distance of the retransmitted data from the re-scheduled time-frequency resource according to a specific rule, for example, the foregoing frequency-domain offset $\Delta k \neq 0$ or time-domain offset $\Delta k \neq 0$.

Specifically, compared with a solution of directly notifying a re-allocated (punctured) time-frequency resource and a supplementary-transmission time-frequency resource separately, a solution of indicating the re-allocated (punctured) time-frequency resource or the supplementary-transmission time-frequency resource and implicitly indicating the retransmission time-frequency resource or the re-allocated (punctured) time-frequency resource by using an offset can save some transmission bits.

More specifically, there may be a plurality of solutions of directly notifying location information of a time-frequency resource. The solutions may be very fine-grained or may be relatively coarse-grained, or even in the solutions, only a time-domain resource is notified and a frequency-domain resource is not notified.

In an example, only a mini-slot number in time domain is notified. One slot may include locations of four mini-slots. In this solution, URLLC occupies one of the four mini-slots, and two bits are required to directly indicate a specific time-domain location of a re-allocated (punctured) time-frequency resource or a supplementary-transmission time-frequency resource. It may be agreed on that a delay of only one mini-slot is allowed, and if only an offset is indicated, only one bit is required to indicate the time-domain location.

In another example different from the foregoing example, URLLC may occupy a plurality of mini-slots, and four bits are required to directly indicate a specific time-domain location of a re-allocated (punctured) time-frequency resource or a supplementary-transmission time-frequency resource. In this case, it may be agreed on that a delay of only one mini-slot is allowed. This can save more system resources.

In another example, a similar simplified shifting rule may be followed, for example, it is agreed on that shifting by only one symbol, one slot, or the like can be performed. Compared with a solution for directly indicating a location of a time-frequency resource punctured in the slot s, this solution does not require a resource used for sending indication information of the punctured time-frequency resource.

In another solution, a frequency-domain location may alternatively be notified. For example, in a solution, a direct notification of an RB resource used during occupation by URLLC or retransmission requires a dozen of or more than 20 bits according to an existing protocol. In this implementation, it may be agreed on that shifting by some locations may be performed in frequency domain. If the locations are indicated by a number of several bits, only the several bits are required in a manner in which only an offset is indicated.

In other words, usually, a protocol specifies a possible value of the foregoing frequency-domain offset $\Delta k \neq 0$ or the time-domain offset $\Delta l \neq 0$. A quantity of possible values is limited, for example, there are M possible values. A quantity of bits occupied by a resource indication used to indicate the M possible values is less than a quantity of bits occupied for directly indicating a frequency-domain location and/or a time-domain location.

As described above, the data may also be directly scheduled onto a later slot and sent.

In an alternative solution, if there is a pilot, a control channel, a broadcast channel, or the like of eMBB on a supplementary-transmission time-frequency resource, shifting may be not performed, or there is no offset (offset is 0), and the locations may be bypassed, that is, the unavailable locations are not occupied for supplementary transmission. Certainly, specified rate matching needs to be performed on supplementarily transmitted data to adapt to supplementary-transmission time-frequency resources that decrease.

In example 5, only some resource indications are the same during supplementary transmission (retransmission).

Referring to FIG. 2E, in this implementation, a coarse-grained frequency-domain resource is used when eMBB data punctured by an URLLC mini-slot is supplementarily transmitted (retransmitted) in the slot s. For example, a frequency-domain resource in which one or more code blocks CBs occupied by an URLLC mini-slot are located is used during supplementary transmission (retransmission), or an entire frequency-domain resource of the eMBB data is occupied in a most coarse-grained manner. A time-domain resource may be the same as a time-domain resource of an URLLC mini-slot. For example, symbol quantities are the same.

To make the solutions clear, a code block CB is described now. In a Long Term Evolution (LTE) technology, a process in which a transmit end processes data includes: adding a cyclic redundancy check (CRC) to a transport block (TB); dividing the TB into one or more code blocks (CB), and adding a CRC to each CB; and performing operations such as coding, rate matching, and resource mapping on each CB, and sending the CB. After receiving data, a receive end performs inverse operations such as inverse resource mapping and inverse rate matching, and attempts to decode each CB. If a CRC check for data obtained after all CBs are decoded succeeds, and a CRC check for the TB succeeds, the receive ends feeds back a 1-bit (bit) acknowledgment (ACK) indication, to notify the transmit end that the TB is successfully transmitted; or if a CRC check for data obtained after a CB is decoded fails or a CRC check for the TB fails, the receive end feeds back a i-bit negative acknowledgment (unacknowledgement, NACK) indication, to notify the transmit end that the TB fails to be transmitted, and the transmit end can retransmit data for the TB, to ensure data communication reliability.

Based on the foregoing solution, for a retransmission resource indication, a coarse-grained indication may be used in frequency domain, or even no frequency-domain resource may be indicated, and only a time-domain location needs to be indicated. Generally, more bits are required to indicate a frequency-domain resource. The foregoing solution can greatly save indication resources.

In this case, an amount of retransmitted data is greater than an amount of data punctured by the URLLC, for example, the retransmitted data is distributed within an eMBB frequency band of a next slot. Therefore, only a time-domain location needs to be indicated for the retransmitted data, and in this case, it can be implicitly known that URLLC puncturing occurs in which symbols in a previous slot.

It should be noted that the foregoing diagrams only simply show examples of data structures, and the data structures may also be combined without violating logic. Details are not described herein.

Referring to the data structures in FIG. 2A to FIG. 2E, a transmission process in a subsequent slot is described in detail in the following.

At a transmit end:

301. The transmit end maps, in a slot s, a complex-number symbol $y(0), y(1), \ldots, y(M_{symb}-1)$ obtained by performing modulation, layer mapping, and precoding on eMBB data onto a scheduled available time-frequency resource element RE first in frequency domain and then in time domain, where coordinates of the time-frequency resource element are expressed as (k,l), k represents a frequency-domain RE, and l represents a time-domain symbol. Generally, the available time-frequency resource element does not include a time-frequency resource element predefined as being occupied by a broadcast channel, a pilot, or the like.

303. When needing to transmit URLLC data, the transmit end transmits the URLLC data in some time-frequency resource elements in the slot s, where no eMBB data symbols are mapped onto the time-frequency resource elements occupied by the URLLC; the occupied time-frequency resource elements are expressed as $(k_p, l_p)$, where $k_{min} \leq k_p \leq k_{max}$, $l_{min} \leq l_p \leq l_{max}$, $k_p$ is used to indicate a specific frequency-domain resource, and $l_p$ is used to indicate a specific time-domain resource; and eMBB data symbols that are not sent (or that are occupied, or that should have been mapped) are expressed as $y(m), y(m+1), \ldots, y(n)$ sequentially, where m represents the first data symbol mapped onto the occupied resource elements $(k_p, l_p)$ first in frequency domain and then in time domain, and n represents the last data symbol mapped onto the occupied resource elements.

It should be noted that the occupied data may be consecutive or inconsecutive, depending on resource locations actually occupied by the URLLC. FIG. 2A to FIG. 2E show only a case in which the occupied data is consecutive. In another manner, the URLLC occupies inconsecutive time-frequency resource elements, and supplementarily transmitted or retransmitted data may also be inconsecutive.

305. Perform subsequent scheduling for a same receive end. For example, a scheduled resource element is denoted as a slot s+t, where t≥1, and the slot may be a next slot, or a slot in a current process, or another slot.

A supplementary-transmission (retransmission) resource element (k',l') is determined in the resource element slot s+t normally scheduled by the receive end, where $k_{min}+\Delta k \leq k' \leq k_{max}+\Delta k$, and $l_{min}+\Delta l \leq l' \leq l_{max}+\Delta l$. In other words, a relative resource location that is the same as a location occupied by the URLLC during previous transmission is occupied, that is, $\Delta k=0, \Delta l=0$; or a resource location that has a relative offset from (or a same shape as) a location occupied by the URLLC is occupied, that is, $\Delta k \neq 0$ or $\Delta l \neq 0$.

Optionally, data $y(m), y(m+1), \ldots, y(n)$ that is not transmitted in the $s^{th}$ slot is mapped onto the retransmission resource element (k',l') first in frequency domain and then in time domain. Optionally, mapping may be performed first in time domain and then in frequency domain. In this way, a specified interleaving diversity effect can be achieved.

It should be noted that the foregoing $k$, $k_p$, $k'$, $k_{min}$, $k_{max}$ in frequency domain usually only need to represent relative locations of RB resources scheduled for data, and do not directly represent absolute RB resource locations in system bandwidth. In other words, even in adaptive HARQ scheduling, absolute locations of frequency-domain resources for eMBB scheduled data in the $(s+t)^{th}$ slot and the $s^{th}$ slot are different, and it is only required that a relative location relationship between the resource location occupied by the URLLC and a frequency-domain resource location of the eMBB data should be the same as a relative location relationship between a retransmission resource location and the frequency-domain resource location of the eMBB data.

For details, refer to the descriptions in FIG. 2A to FIG. 2E in which a frequency-domain distance Ks is the same as a frequency-domain distance Ks+t and a time-domain distance Ls is the same as a time-domain distance Ls+t, and details are not described herein again.

307. Perform, based on a quantity of available resource elements (for example, a quantity of RE resources, and if there are a plurality of layers, the quantity of available resource elements needs to be multiplied by a quantity of layers) left after resource elements occupied for supplementary transmission (retransmission) are deducted, rate matching on eMBB data normally scheduled in the $(s+t)^{th}$ slot, and map data symbols onto the resource elements first in frequency domain and then in time domain.

Certainly, occupation by the URLLC may also occur in the normally-scheduled $(s+t)^{th}$ slot. If so, the URLLC may occupy a resource element not occupied by supplementarily transmitted data; or supplementary transmission may be performed in a later slot, and data occupied by the URLLC is retransmitted in a same manner; or shifting may be performed in the slot based on the foregoing description to bypass the URLLC. Details are not described herein.

309. Optionally, to ensure a same resource-retransmission-based data quantity, a rank quantity of data in the $(s+t)^{th}$ slot needs to be the same as a rank quantity in the $s^{th}$ slot, but a modulation and coding scheme (MCS, Modulation and Coding Scheme), PMI precoding, and the like in the $(s+t)^{th}$ slot may be different from those in the $s^{th}$ slot. Correspondingly, a rank quantity of data that is not sent in the $s^{th}$ slot but is supplementarily transmitted (retransmitted) in the $(s+t)^{th}$ slot is the same as a rank quantity of data normally scheduled in the $(s+t)^{th}$ slot, PMIs are the same, an RS is shared, but MCSs may be different.

Generally, for the resource-retransmission-based manner, a size of the supplementarily transmitted data needs to be the same as a size of occupied data, but actually, the sizes are slightly different (for example, more or less data is transmitted supplementarily), and impact on performance is not great provided that a data location is parsed correctly.

311. The transmit end sends a supplementary transmission (retransmission) information indication message to the receive end, where the supplementary transmission (retransmission) information indication is used to indicate information about a resource location occupied for supplementary transmission (retransmission) during current transmission. Alternatively, the transmit end may send information about a location occupied by the URLLC, to implicitly obtain supplementary transmission location information.

The resource location information includes frequency-domain resource information or time-domain resource information; or optionally, may further include a frequency-domain offset Δk and/or a time-domain offset Δl. Related details have been provided above and are not described herein again.

In addition, optionally, the resource location information further includes scheduling information such as an MCS, a hybrid automatic repeat request (HARQ, Hybrid Automatic Repeat Request) process number, a redundancy version RV, or an NDI. Certainly, alternatively, the information may be directly obtained based on information stored by the receive end during previous transmission.

In addition, optionally, an additional field may be added to a downlink control indication (DCI, Downlink Control Indication), to indicate a current new retransmission mode, that is, a manner of supplementarily sending data that is not sent due to transmission of another service; or an NDI field is expanded into two bits, to indicate the new retransmission mode.

In a specific example, the supplementary transmission (retransmission) information indication may be carried in an additional field in a DCI message of the normally scheduled data, or may be separately carried in a DCI message. Both of the two types of DCI messages are located in a detection time window of a normal downlink control channel.

Alternatively, the supplementary transmission (retransmission) information indication may be embedded into a data channel. Specifically, a second-level DCI indication information field is added to a normal DCI. The second-level DCI indication information field is used to indicate a specific location of the retransmission information indication information in the data channel.

At a receive end:

401. The receive end normally receives the eMBB data in the $s^{th}$ slot, and because at this time, it is unknown that some of the eMBB data is occupied by URLLC, based on a decoding latency, the receive end may have completed decoding and fed back an ACK/a NACK message, or may not start decoding.

403. The receive end parses a DCI message of the eMBB in the $(s+t)^{th}$ slot and performs blind detection based on a DCI size, or the receive end determines, based on an indication of a new retransmission mode in the DCI, that current transmission is in a hybrid transmission mode, that is, a currently transmitted data packet includes normally scheduled eMBB data and eMBB data (retransmitted data) that is supplementarily transmitted because a time-frequency resource is occupied by the URLLC previously.

405. The receive end further parses a retransmission information indication in the DCI, or parses out a retransmission information indication based on a second-level indication of the DCI, to obtain location information of a retransmission resource, namely, the foregoing frequency-domain resource or symbol. Optionally, a frequency-domain offset Δk and/or a time-domain offset Δl may be further included.

407. The receive end implicitly calculates, based on the location information of the retransmission resource and optionally, the frequency-domain offset Δk and/or a time-domain offset Δl, location information of a resource occupied by the URLLC in the $s^{th}$ slot, to remove, from a HARQ cache or soft information obtained through demodulation, soft information of corresponding data on the time-frequency resource. This can avoid negative impact of erroneous soft information on decoding performance.

409. The receive end obtains, through demodulation based on the location information of the retransmission resource and optionally, MCS information or directly based on an MCS recorded by the receive end in the $s^{th}$ slot, the soft information from retransmitted data in the $(s+t)^{th}$ slot; uses the soft information to replace soft information obtained through demodulation on a time-frequency resource occupied by the URLLC in the $s^{th}$ slot or information in the HARQ cache; decodes the replaced soft information or the replaced information in the HARQ cache; and feeds back an ACK/a NACK message based on a decoding result.

411. The receive end obtains information of an available resource of normal data in the $(s+t)^{th}$ slot based on the location information of the retransmission resource, performs rate matching, demodulation, and decoding, and feeds back an ACK/a NACK message of the normal data based on a decoding result.

It should be noted that a normal resource is usually indicated by a normal DCI, and a difference from a common resource lies in that some time-frequency resources are occupied for supplementary transmission, and therefore specific time-frequency resources occupied by the normal resource can be clearly learned based on the location information indication.

Specifically, for steps 409 and 411, the receive end may feed back more than one ACK/NACK to the transmit end in a hybrid retransmission mode (that is, the normally scheduled eMBB data and the supplementarily transmitted data are transmitted together) in the $(s+t)^{th}$ slot. Certainly, it should be noted that this is merely possible, but not mandatory. In another possible solution, an ACK/a NACK of the supplementarily transmitted data may be fed back according to normal time, or an ACK/a NACK may be fed back for both the supplementarily transmitted data and the normally scheduled eMBB data.

Figure 3:
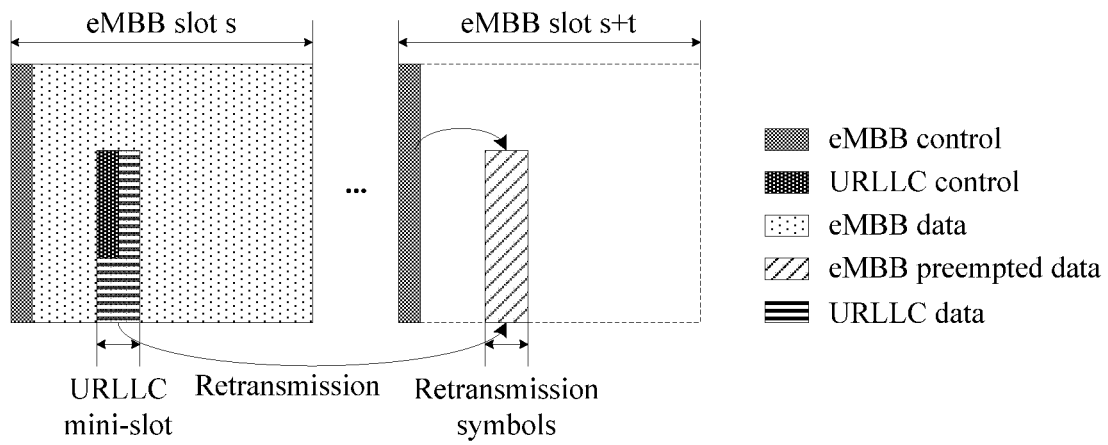
FIG. 3 to FIG. 7 each are a simplified schematic diagram of a data structure according to an embodiment of the present invention.

Implementation 2:

Independent partial retransmission mode of to-be-retransmitted data:

Different from the data structures shown in FIG. 2A to FIG. 2E, in the data structure shown in FIG. 3, supplementarily transmitted (retransmitted) data sent to a common terminal 102 may also independently occupy a subsequent eMBB scheduling unit for transmission. In other words, data that is not sent because a time-frequency resource is occupied by the URLLC in the eMBB slot s is sent in a subsequent eMBB slot s+t, where except for the supplementarily transmitted (retransmitted) data, there is no other eMBB data in the eMBB slot s+t.

Except for the foregoing difference, a change or a combination may also be made to the data structure in FIG. 3 with reference to the data structure shown in FIG. 2A to FIG. 2E without violating logic. For example, a frequency-domain resource allocated in the eMBB slot s+t is different from that in an eMBB slot s. For another example, the URLLC occupies an entire frequency-domain resource or the like of eMBB data.

Specifically, at the transmit end, the eMBB slot s+t does not include other scheduled data, but usually includes a normally sent reference signal RS. The RS is used to assist the receive end in performing operations such as channel estimation or measurement on supplementarily transmitted (retransmitted) data.

Similarly, the transmit end sends a retransmission information indication message to the receive end. The retransmission information indication message is similar to that in the foregoing solution, and details are not described herein again.

Similarly, the retransmission information indication message may be an independent DCI message, and is sent within a detection time window of a normal downlink control channel.

Similarly, at a receive end:

501. The receive end normally receives the eMBB data in the $s^{th}$ slot, and because at this time, it is unknown that some of the eMBB data is occupied by URLLC, based on a decoding latency, the receive end may have completed decoding and fed back an ACK/a NACK message, or may not start decoding.

503. The receive end parses a DCI message of eMBB in the $(s+t)^{th}$ slot, and performs blind detection based on a DCI size, or the receive end knows, based on an indication of a new retransmission mode in the DCI, that current transmission is in an independent partial retransmission mode.

505. The receive end further parses a retransmission information indication message in the DCI, or parses out a retransmission information indication message based on a second-level indication of the DCI, to obtain location information of a retransmission resource. Specific information is similar to the foregoing description, and details are not described herein again.

507. The receive end implicitly determines, based on the location information of the retransmission resource and optionally, a frequency-domain offset $\Delta k$ and a time-domain offset $\Delta l$, location information of a resource occupied by the URLLC in the $s^{th}$ slot, to remove (or delete) soft information in corresponding data from a HARQ cache or soft information obtained through demodulation. This avoids serious impact of erroneous soft information on decoding performance.

509. The receive end obtains, through demodulation based on the location information of the retransmission resource and optionally, MCS information (or directly based on an MCS recorded by the receive end in the $s^{th}$ slot), the soft information from retransmitted data in the $(s+t)^{th}$ slot; uses the soft information to replace soft information obtained through demodulation on a time-frequency resource occupied by the URLLC in the $s^{th}$ slot or information in the HARQ cache; decodes the replaced soft information obtained through demodulation or the replaced information in the HARQ cache; and feeds back an ACK/a NACK message. This can well improve decoding performance.

Implementation 3: Another Data Mapping Manner

In the examples of the foregoing implementation 1 and implementation 2, in the slot s, a data symbol for which mapping should be performed originally and whose time-frequency resource is occupied by the URLLC is directly skipped, that is, the data symbol for which mapping should be performed originally is not sent, and the data symbol for which mapping should be performed originally is carried in a supplementary-transmission (retransmission) resource element and sent in the slot s+t. Different from the foregoing implementation, in this implementation, another data mapping manner is used. Specifically, in the $s^{th}$ slot, after excluding the resource element occupied by the URLLC, the transmit end performs continuous mapping first in frequency domain and then in time domain, adds the last (or end) data symbol that cannot be mapped, to the supplementary-transmission (retransmission) resource element in the slot s+t for sending.

Similarly, refer to steps 301 to 311 in the foregoing transmit-end solution and transformations thereof. Details are as follows:

In comparison with step 303, in step 303a of this implementation, when URLLC data needs to be transmitted temporarily, a data symbol is no longer mapped onto a resource element occupied by the URLLC, where the occupied resource element is expressed as $(k_p, l_p)$, $k_{min} \le k_p \le k_{max}$, and $l_{min} \le l_p \le l_{max}$; and the transmit end updates actually available resource elements based on the resource element occupied by the URLLC, and consistently performs continuous data symbol mapping first in frequency domain and then in time domain, where $y(m), y(m+1), \ldots, y(M_{symb}-1)$ data symbols are not mapped finally.

In comparison with step 305, in step 305a of this implementation, in the $(s+t)^{th}$ slot subsequently scheduled at this receive end, where $t \le 1$ (the slot may be a next slot, or a slot in a current process, or another slot).

A retransmission resource element $(k', l')$ is determined within the resource element normally scheduled by the receive end, where $k_{min}+\Delta k \le k' \le k_{max}+\Delta k$, and $l_{min}+\Delta l \le l' \le l_{max}+\Delta l$. In other words, a relative resource location that is the same as a location occupied by the URLLC during previous transmission is occupied, and correspondingly, $\Delta k=0$, $\Delta l=0$; or a relative offset location is occupied, that is, $\Delta k \ne 0$ or (and) $\Delta l \ne 0$.

The data $y(m), y(m+1), \ldots, y(M_{symb}-1)$ that is not transmitted in the $s^{th}$ slot is mapped onto the retransmission resource element $(k', l')$ first in frequency domain and then in time domain.

Similarly, refer to steps 401 to 411 in the foregoing receive-end solution and transformations thereof. Differences are as follows:

In comparison with step 407, in step 407a, the receive end implicitly calculates, based on the location information of the retransmission resource (and optionally, a frequency-domain offset Δk and/or a time-domain offset Δl), location information of a resource occupied by the URLLC in the $s^{th}$ slot, and performs operations such as rate de-matching and demodulation on eMBB data based on an actually available resource element obtained after update.

In comparison with 409, in 409a, the receive end obtains, through demodulation based on the location information of the retransmission resource and optionally, MCS information (which may alternatively be directly obtained based on an MCS recorded by the receive end in the $s^{th}$ slot), soft information from retransmitted data in the $(s+t)^{th}$ slot, adds the soft information to an end of soft information obtained through demodulation in the $s^{th}$ slot, performs decoding, and feeds back an ACK/a NACK message.

In this way, eMBB data decoding performance can be improved by using the foregoing method.

Implementation 4:

CB-level-based rate matching manner.

The foregoing embodiments mainly relate to resource-element-based occupation. In this case, a retransmission resource needs to be the same as a resource occupied during previous transmission; otherwise, some resources are not retransmitted. However, if one or more CBs are occupied by the URLLC during previous transmission, a size of a resource used during retransmission is not necessarily the same as a size of the occupied resource. Rate matching of the one or more CBs may be performed to adapt to an available resource element used during retransmission. This implementation is more flexible than the foregoing implementation. It can be understood that some CBs used during previous transmission may be occupied partially. In this case, the partially occupied CBs also need to be supplementarily transmitted during retransmission.

In this case, the retransmission information indication message may also be embedded into a retransmission resource element and sent.

Implementation 5:

In the foregoing implementations, all supplementarily transmitted (retransmitted) data is carried in some symbols and some frequency-domain resources within an eMBB slot scheduling unit. In this implementation, a mini-slot is directly used to carry supplementarily transmitted (retransmitted) eMBB data.

Figure 4:
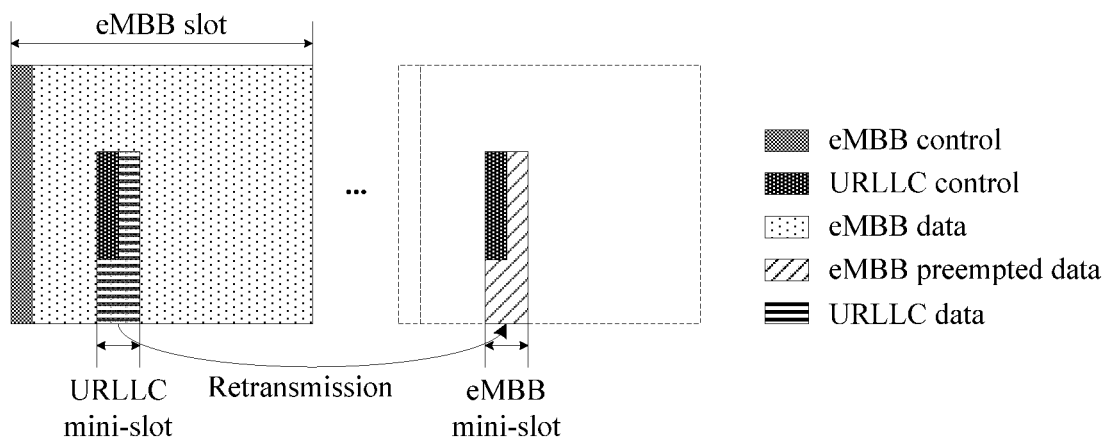
Figure 5:
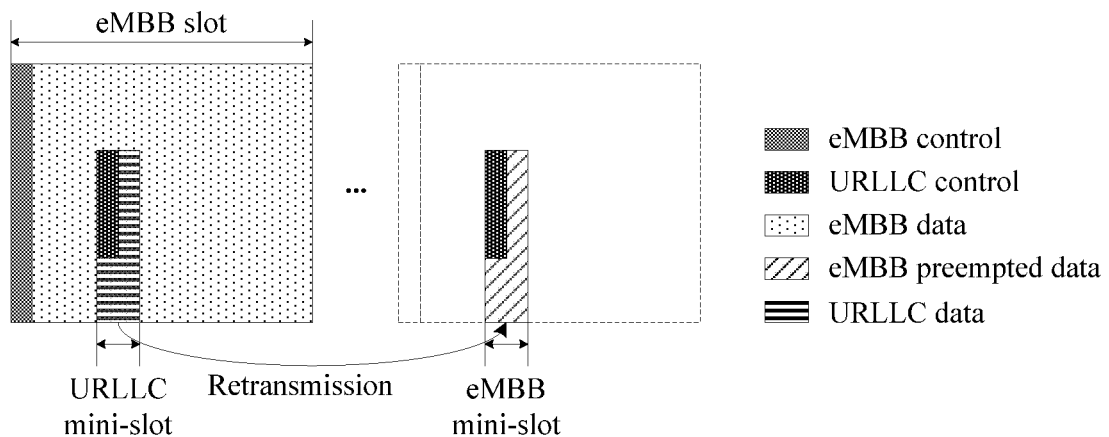

For details, refer to a simplified schematic diagram of a data structure in FIG. 4 or FIG. 5. A difference from the foregoing implementations lies in that the supplementarily transmitted (retransmitted) eMBB data is carried in one mini-slot for transmission. Compared with a common time-frequency resource, a mini-slot includes complete parts: control information and data. Specifically, the control information part of the mini-slot is used to carry scheduling information and the like, and the data part is used to carry the supplementarily transmitted (retransmitted) eMBB data. The mini-slot usually further includes reference signals, where the reference signals are distributed in the mini-slot according to a specified rule, and are independent of the control information and the data information.

In FIG. 4, the mini-slot used for supplementary transmission (retransmission) is located in a data part in a subsequent eMBB slot sent to the receive end, and FIG. 4 shows a mini-slot based hybrid retransmission mode. In FIG. 5, a location of the mini-slot used for supplementary transmission (retransmission) is unrelated to that of a subsequent eMBB slot in which a data part is sent to the receive end, and FIG. 5 shows a mini-slot based partial retransmission mode.

Compared with other implementations, in the two embodiments shown in FIG. 4 and FIG. 5, there is no impact on operations of normally scheduled eMBB. However, because a DCI message and a reference signal RS for the URLLC are included in the mini-slot, it is very difficult for a quantity of available resource elements to be the same as a quantity of resource elements occupied during previous transmission. Therefore, in the embodiment shown in FIG. 4 or FIG. 5, when one or more CBs are occupied, rate matching may be performed to adapt to an actually available resource element.

Similar to other implementations, relative locations of symbols and time-domain resources that are occupied by the supplementary-transmission mini-slot are the same as those of frequency and domain resources that are occupied by the URLLC during current transmission (or there is a time-domain offset or a frequency-domain offset). Location information of a retransmission resource is directly carried in a DCI of the mini-slot. The receive end may implicitly calculate, based on information about the received retransmitted mini-slot, information about a resource occupied by the URLLC during previous transmission, so that a corresponding erasing operation and a replacement operation for retransmitted soft information can be performed in a HARQ cache at the receive end.

It should be noted that there may be a plurality of possible cases for content of an eMBB supplementary-transmission (retransmission) resource indication, and this is not limited in this specification (that is, the solution for the specific indication of the location information of the retransmission resource).

The content usually includes, for example, a time-domain symbol number or a relative frequency-domain RB number.

In addition, a mini-slot is introduced in a current standard, the mini-slot includes two symbols, but a possibility is not excluded that another possible quantity of symbols, for example, one symbol, three symbols, four symbols, five symbols, six symbols, or seven symbols, are defined subsequently. Therefore, an eMBB supplementary-transmission (retransmission) resource may also be indicated by using a mini-slot number. This technical solution saves more bits than a solution of using a symbol number for indication.

In another possible solution, it is further constrained that a CB group of eMBB needs to use a mini-slot as a boundary in time domain. In this case, a CB group number is similar to a mini-slot number. Therefore, the supplementary-transmission (retransmission) resource may alternatively be indicated by using a CB group number.

Figure 6:
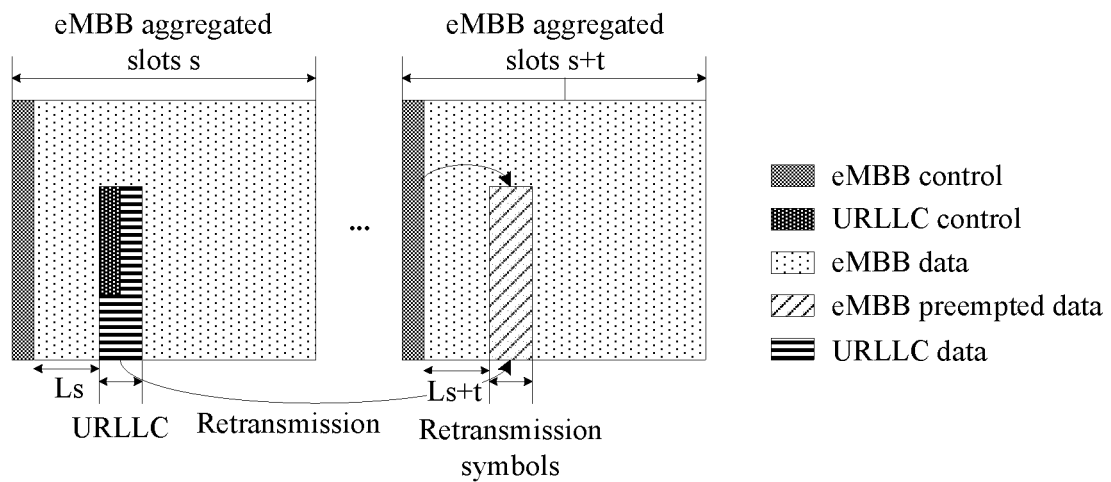
Figure 7:
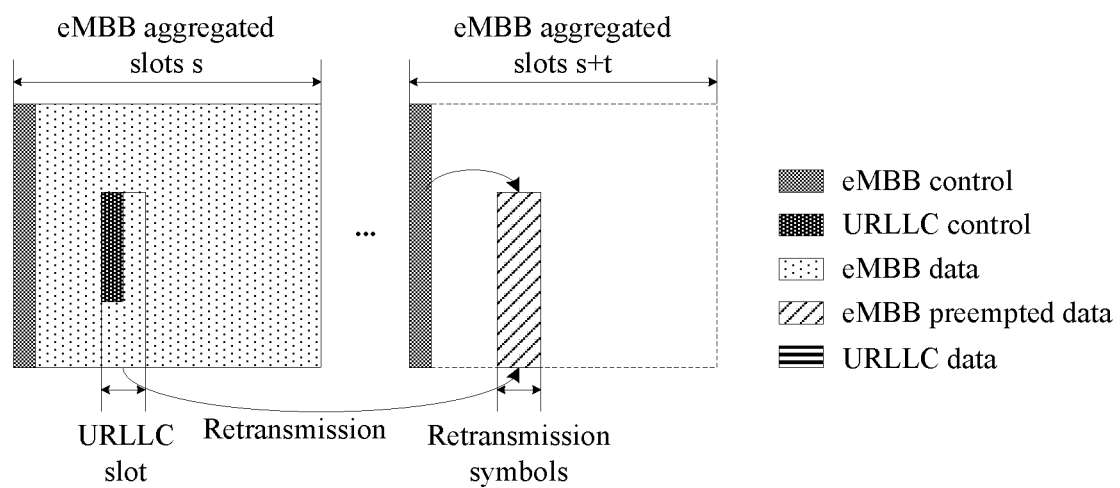

In addition, optionally, as mentioned above, URLLC may be carried in a mini-slot, or may be carried in a slot with a large SCS (subcarrier spacing). When the URLLC is carried in a slot with a large SCS, eMBB is usually carried in aggregated slots (aggregated slots). In this case, a time-domain indication of the supplementary-transmission (retransmission) resource may be slot numbers of the aggregated slots. FIG. 6 and FIG. 7 separately show a possible data structure, and other data structures are not described.

It should be noted that optionally, the foregoing embodiments are described by using an example in which an eMBB service is carried in a slot and a URLLC service is carried in a mini-slot. Another similar implementation includes but is not limited to that an eMBB service is carried in aggregated slots with a large subcarrier width and a URLLC service is carried in a slot, or that an eMBB service is carried in another time-frequency resource of a relatively large granularity and a URLLC service is carried in another time-frequency resource of a granularity smaller than the relatively large granularity.

Figure 8:
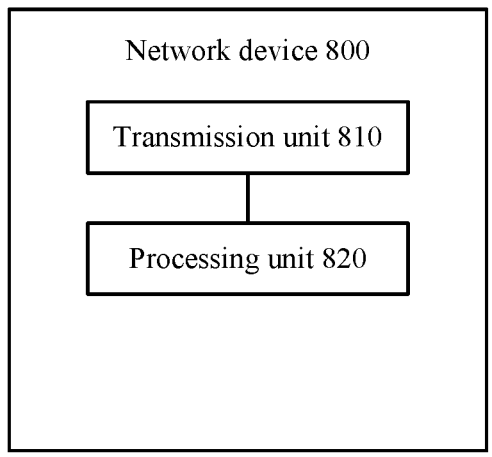
FIG. 8 and FIG. 9 each are a schematic block diagram of a transmit end according to an embodiment of the present invention.

FIG. 8 is a schematic block diagram of a transmit end 800 according to an embodiment of the present invention. As shown in FIG. 8, the transmit end 800 includes a transmission unit 810 and a processing unit 820.

The processing unit 820 is configured to determine a scheduled first time-frequency resource, where the first time-frequency resource is scheduled for the transmit end to send first data, and a re-allocated time-frequency resource in the first time-frequency resource is scheduled to send second data.

The transmission unit 810 is configured to: send the second data on the re-allocated time-frequency resource; send a part of the first data on a remaining first time-frequency resource other than the re-allocated time-frequency resource; and send, for the transmit end, a remaining part of the first data that is not sent due to occupation by the second data, by using a supplementary-transmission time-frequency resource, determined based on the re-allocated time-frequency resource, in a second time-frequency resource.

For a working principle of the transmit end, refer to the method in FIG. 1A and related descriptions in this specification. Details are not described herein again.

The transmit end device in this embodiment of the present invention sends the remaining part of the first data that is not sent due to occupation by the second data, by using the supplementary-transmission time-frequency resource, determined based on the re-allocated time-frequency resource, in the second time-frequency resource, so that a receive end can increase a possibility of correctly receiving data. Further, reception performance can be improved through fewer indication resources.

It should be noted that in this embodiment of the present invention, the transmission unit 810 may be implemented by a transmitter and/or a receiver.

Figure 9:
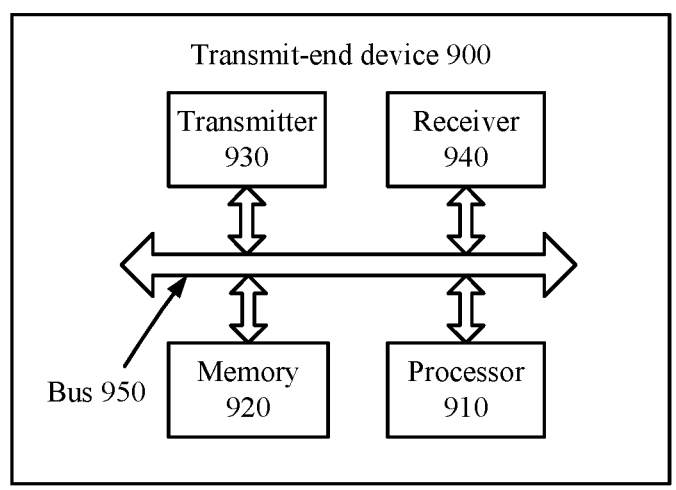

As shown in FIG. 9, a transmit end 900 may include a processor 910, a memory 920, a transmitter 930, and a receiver 940. The memory 920 is configured to store instructions, and the processor 910, the transmitter 930, and the receiver 940 are configured to execute the instructions stored in the memory 920 to perform wireless communication control.

Various components of the transmit end 900 may be coupled together by using a bus system 950. In addition to a data bus, the bus system 950 further includes a power bus, a control bus, and a status signal bus.

It should be noted that the foregoing method embodiments of the present invention may be applied to a processor, or implemented by a processor. The processor may be an integrated circuit chip and is capable of processing signals. In an implementation process, the steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component; and can implement or perform the methods, the steps, and logical block diagrams that are disclosed in the embodiments of the present invention. The general purpose processor may be a microprocessor, or the processor may be any conventional processor or the like. The steps in the methods disclosed with reference to the embodiments of the present invention may be directly executed and accomplished by using a hardware decoding processor, or may be executed and accomplished by using a combination of hardware and software modules in the decoding processor. A software module may be located in a storage medium mature in the art such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It can be understood that the memory in the embodiments of the present invention may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus dynamic random access memory (Direct Rambus RAM, DR RAM). It should be noted that the memory in the systems and methods described in this specification includes but is not limited to these and any memory of another proper type.

It should be understood that the transmit end 800 shown in FIG. 8 or the transmit end 900 shown in FIG. 9 can implement the processes implemented in the foregoing method embodiments. To avoid repetition, details are not described herein again.

Figure 10:
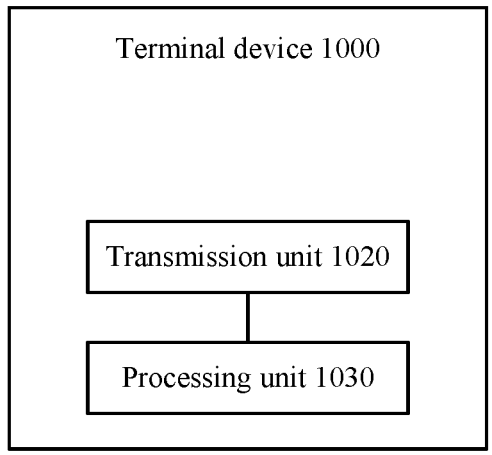
FIG. 10 and FIG. 11 each are a schematic block diagram of a receive end according to an embodiment of the present invention.

FIG. 10 is a schematic block diagram of a receive end 1000 according to an embodiment of the present invention. As shown in FIG. 10, the receive end 1000 includes a transmission unit 1020 and a processing unit 1030.

The processing unit 1030 is configured to determine a scheduled first time-frequency resource, where the first time-frequency resource is scheduled for a transmit end to send first data, and a re-allocated time-frequency resource in the first time-frequency resource is scheduled to send second data.

The transmission unit 1020 is configured to: receive a part of the first data on the first time-frequency resource; and receive a remaining part of the first data on a supplementary-transmission time-frequency resource determined based on the re-allocated time-frequency resource.

The processing unit 1030 is further configured to process the first data based on the re-allocated time-frequency resource and the supplementary-transmission time-frequency resource.

The receive end in this embodiment of the present invention receives the part of the first data on the first time-frequency resource, receives the remaining part of the first data on the supplementary-transmission time-frequency resource determined based on the re-allocated time-frequency resource, and processes the first data based on the re-allocated time-frequency resource and the supplementary-transmission time-frequency resource, so that the receive end can increase a possibility of correctly receiving data. Further, reception performance can be improved through fewer indication resources.

It should be noted that in this embodiment of the present invention, the transmission unit 1020 may be implemented by a receiver and/or a transmitter, and the processing unit 1030 may be implemented by a processor.

Figure 11:
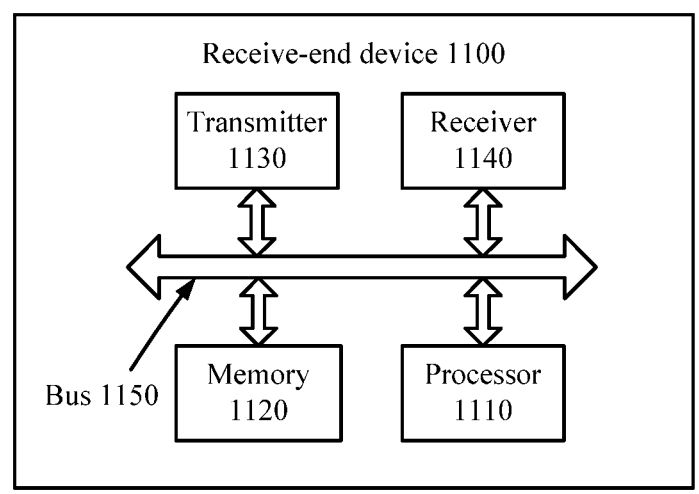

As shown in FIG. 11, a receive end 1100 may include a processor 1110, a memory 1120, a transmitter 1130, and a receiver 1140. The memory 1120 is configured to store instructions, and the processor 1110, the transmitter 1130, and the receiver 1140 are configured to execute the instructions stored in the memory 1120 to perform wireless communication control.

Various components of the receive end 1100 may be coupled together by using a bus system 1150. In addition to a data bus, the bus system 1150 includes a power bus, a control bus, and a status signal bus.

It should be noted that the foregoing method embodiments of the present invention may be applied to a processor, or implemented by a processor. The processor may be an integrated circuit chip and is capable of processing signals. In an implementation process, the steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component; and can implement or perform the methods, the steps, and logical block diagrams that are disclosed in the embodiments of the present invention. The general purpose processor may be a microprocessor, or the processor may be any conventional processor or the like. The steps in the methods disclosed with reference to the embodiments of the present invention may be directly executed and accomplished by using a hardware decoding processor, or may be executed and accomplished by using a combination of hardware and software modules in the decoding processor. A software module may be located in a storage medium mature in the art such as a random access memory, a flash memory, a read-only memory, a programmable read-only memory, an electrically erasable programmable read-only memory, or a register. The storage medium is located in the memory, and a processor reads information in the memory and completes the steps in the foregoing methods in combination with hardware of the processor.

It can be understood that the memory in the embodiments of the present invention may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct Rambus dynamic random access memory (Direct Rambus RAM, DR RAM). It should be noted that the memory in the systems and methods described in this specification includes but is not limited to these and any memory of another proper type.

It should be understood that the receive end 1000 shown in FIG. 10 or the receive end 1100 shown in FIG. 11 can implement the processes implemented in the foregoing method embodiments. To avoid repetition, details are not described herein again.

In an embodiment, a wireless communications apparatus, comprises a processing unit, configured to determine a scheduled first time-frequency resource, wherein the first time-frequency resource is scheduled for a transmit end to send first data, and a re-allocated time-frequency resource in the first time-frequency resource is scheduled to send second data; and a transmission unit, configured to: receive a part of the first data on the first time-frequency resource; and receive a remaining part of the first data on a supplementary-transmission time-frequency resource determined based on the re-allocated time-frequency resource, wherein the processing unit is further configured to process the first data based on the re-allocated time-frequency resource and the supplementary-transmission time-frequency resource. In an embodiment, the transmission unit is further configured to transmit a resource indication used to indicate the re-allocated time-frequency resource and the supplementary-transmission time-frequency resource; and obtain, for the receive end, the re-allocated time-frequency resource and the supplementary-transmission time-frequency resource based on the resource indication. In an embodiment, the transmission unit is further configured to: transmit a first resource indication used to indicate the re-allocated time-frequency resource, wherein the first resource indication is used to implicitly indicate the supplementary-transmission time-frequency resource; and obtain the re-allocated time-frequency resource based on the first resource indication, and implicitly obtain the supplementary-transmission time-frequency resource based on the first resource indication; or transmit a second resource indication used to indicate the supplementary-transmission time-frequency resource, wherein the second resource indication is used to implicitly indicate the re-allocated time-frequency resource; and obtain the supplementary-transmission time-frequency resource based on the second resource indication, and implicitly obtain the re-allocated time-frequency resource based on the second resource indication. In an embodiment, the supplementary-transmission time-frequency resource determined based on the re-allocated time-frequency resource comprises: a frequency-domain relative start location Ks+t of the supplementary-transmission time-frequency resource in the second time-frequency resource is the same as a frequency-domain relative start location Ks of the re-allocated time-frequency resource in the first time-frequency resource; and/or a time-domain relative start location Ls+t of the supplementary-transmission time-frequency resource in the second time-frequency resource is the same as a time-domain relative start location Ls of the re-allocated time-frequency resource in the first time-frequency resource. In an embodiment, the supplementary-transmission time-frequency resource determined based on the re-allocated time-frequency resource comprises: there is an offset between a frequency-domain relative start location of the supplementary-transmission time-frequency resource in the second time-frequency resource and a frequency-domain relative start location of the re-allocated time-frequency resource in the first time-frequency resource; and/or there is an offset between a time-domain relative start location of the supplementary-transmission time-frequency resource in the second time-frequency resource and a time-domain relative start location of the re-allocated time-frequency resource in the first time-frequency resource, wherein $\Delta k \neq 0$ or $\Delta l \neq 0$. In an embodiment, the supplementary-transmission time-frequency resource and the re-allocated time-frequency resource occupy a same quantity of time-domain resource elements. In an embodiment, the supplementary-transmission time-frequency resource and the re-allocated time-frequency resource occupy a same frequency-domain resource element. In an embodiment, the processing unit is configured to process the first data based on the re-allocated time-frequency resource and the supplementary-transmission time-frequency resource comprises: deleting soft information demodulated on the re-allocated time-frequency resource from soft information demodulated on the first time-frequency resource, and decoding the first data in combination with soft information demodulated on the supplementary-transmission time-frequency resource.

It should be understood that "one embodiment" or "an embodiment" mentioned throughout this specification does not mean that particular features, structures, or characteristics related to the embodiment are included in at least one embodiment of the present invention. Therefore, "in one embodiment" or "in an embodiment" appearing throughout this specification does not necessarily refer to one embodiment. In addition, these particular features, structures, or characteristics may be combined in one or more embodiments in any appropriate manner.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that the method steps and units described with reference to the embodiments disclosed in this specification can be implemented by electronic hardware, computer software, or a combination thereof. To clearly describe the interchangeability between the hardware and the software, the foregoing has generally described steps and compositions of each embodiment according to functions. Whether the functions are implemented by hardware or software depends on particular applications and design constraints of the technical solutions. A person of ordinary skill in the art may use different methods to implement the described functions for each particular application, but it shall not be considered that the implementation goes beyond the scope of the present invention.

It may be clearly understood by a person skilled in the art that, for the purpose of convenient and brief description, for a specific working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored, or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining a scheduled first time-frequency resource, wherein the first time-frequency resource is scheduled for a transmit end to send first data, and the first time-frequency resource comprises a re-allocated time-frequency resource that is re-allocated to send second data;
   sending, by the transmit end, the second data on the re-allocated time-frequency resource;

sending, by the transmit end, a first part of the first data on a remaining part of the first time-frequency resource other than the re-allocated time-frequency resource; and sending, by the transmit end, a remaining part of the first data other than the first part of the first data on a supplementary-transmission time-frequency resource in a second time-frequency resource, the supplementary-transmission time-frequency resource is determined according to the re-allocated time-frequency resource.

2. The method according to claim 1, wherein the method further comprises:
transmitting a resource indication indicating the re-allocated time-frequency resource and the supplementary-transmission time-frequency resource.

3. The method according to claim 2, wherein transmitting the resource indication indicating the re-allocated time-frequency resource and the supplementary-transmission time-frequency resource comprises:
transmitting a first resource indication explicitly indicating the re-allocated time-frequency resource, wherein the first resource indication implicitly indicates the supplementary-transmission time-frequency resource; or
transmitting a second resource indication explicitly indicating the supplementary-transmission time-frequency resource, wherein the second resource indication implicitly indicates the re-allocated time-frequency resource.

4. The method according to claim 1, wherein:
a frequency-domain relative start location Ks+t of the supplementary-transmission time-frequency resource in the second time-frequency resource is the same as a frequency-domain relative start location Ks of the re-allocated time-frequency resource in the first time-frequency resource; or
a time-domain relative start location Ls+t of the supplementary-transmission time-frequency resource in the second time-frequency resource is the same as a time-domain relative start location Ls of the re-allocated time-frequency resource in the first time-frequency resource.

5. The method according to claim 1, wherein:
there is an offset $\Delta k$ between a frequency-domain relative start location of the supplementary-transmission time-frequency resource in the second time-frequency resource and a frequency-domain relative start location of the re-allocated time-frequency resource in the first time-frequency resource; or
there is an offset $\Delta l$ between a time-domain relative start location of the supplementary-transmission time-frequency resource in the second time-frequency resource and a time-domain relative start location of the re-allocated time-frequency resource in the first time-frequency resource, wherein $\Delta k \neq 0$ or $\Delta l \neq 0$.

6. The method according to claim 1, wherein:
the supplementary-transmission time-frequency resource and the re-allocated time-frequency resource occupy a same quantity of time-domain resource elements.

7. The method according to claim 1, wherein:
the supplementary-transmission time-frequency resource and the re-allocated time-frequency resource occupy a same frequency-domain resource element.

8. A method, comprising:
determining, by a receive end, a scheduled first time-frequency resource, wherein the first time-frequency resource is scheduled for a transmit end to send first data, and the first time-frequency resource comprises a re-allocated time-frequency resource scheduled to send second data;
receiving, by the receive end, a first part of the first data on the first time-frequency resource;
receiving, by the receive end, a remaining part of the first data on a supplementary-transmission time-frequency resource in a second time-frequency resource, the supplementary-transmission time-frequency resource is determined according to the re-allocated time-frequency resource; and
processing, by the receive end, the first data accordingly to the re-allocated time-frequency resource and the supplementary-transmission time-frequency resource.

9. The method according to claim 8, wherein the method further comprises:
transmitting a resource indication indicating the re-allocated time-frequency resource and the supplementary-transmission time-frequency resource; and
obtaining, by the receive end, the re-allocated time-frequency resource and the supplementary-transmission time-frequency resource according to the resource indication.

10. The method according to claim 9, wherein transmitting the resource indication indicating the re-allocated time-frequency resource and the supplementary-transmission time-frequency resource, and obtaining, by the receive end, the re-allocated time-frequency resource and the supplementary-transmission time-frequency resource according to the resource indication comprises:
transmitting a first resource indication indicating the re-allocated time-frequency resource, wherein the first resource indication implicitly indicates the supplementary-transmission time-frequency resource, obtaining the re-allocated time-frequency resource according to the first resource indication, and implicitly obtaining the supplementary-transmission time-frequency resource according to the first resource indication; or
transmitting a second resource indication indicating the supplementary-transmission time-frequency resource, wherein the second resource indication implicitly indicates the re-allocated time-frequency resource, obtaining the supplementary-transmission time-frequency resource according to the second resource indication, and implicitly obtaining the re-allocated time-frequency resource according to the second resource indication.

11. The method according to claim 8, wherein:
a frequency-domain relative start location $K_{s+t}$ of the supplementary-transmission time-frequency resource in the second time-frequency resource is the same as a frequency-domain relative start location Ks of the re-allocated time-frequency resource in the first time-frequency resource; or
a time-domain relative start location $L_{s+t}$ of the supplementary-transmission time-frequency resource in the second time-frequency resource is the same as a time-domain relative start location $L_s$ of the re-allocated time-frequency resource in the first time-frequency resource.

12. The method according claim 8, wherein:
there is an offset $\Delta k$ between a frequency-domain relative start location of the supplementary-transmission time-frequency resource in the second time-frequency resource and a frequency-domain relative start location of the re-allocated time-frequency resource in the first time-frequency resource; or there is an offset between a time-domain relative start location of the supplementary-transmission time-frequency resource in the second time-frequency resource and a time-domain relative start location of the re-allocated time-frequency resource in the first time-frequency resource, wherein $\Delta k \neq 0$ or $\Delta l \neq 0$.

13. The method according to claim 8, wherein:
the supplementary-transmission time-frequency resource and the re-allocated time-frequency resource occupy a same quantity of time-domain resource elements.

14. The method according to claim 8, wherein:
the supplementary-transmission time-frequency resource and the re-allocated time-frequency resource occupy a same frequency-domain resource element.

15. The method according to claim 8, wherein processing, by the receive end, the first data according to the re-allocated time-frequency resource and the supplementary-transmission time-frequency resource comprises:

deleting, by the receive end, soft information demodulated on the re-allocated time-frequency resource from soft information demodulated on the first time-frequency resource; and decoding the first data in combination with soft information demodulated on the supplementary-transmission time-frequency resource.

16. A apparatus, comprising:
a processor configured to determine a scheduled first time-frequency resource, wherein the first time-frequency resource is scheduled for a transmit end to send first data, and the first time-frequency resource comprises a re-allocated time-frequency resource scheduled to send second data; and a transmission unit, configured to:
send the second data on the re-allocated time-frequency resource;

send a first part of the first data on a remaining part of the first time-frequency resource other than the re-allocated time-frequency resource; and send a remaining part of the first data other than the first part of the first data on a supplementary-transmission time-frequency resource in a second time-frequency resource, the supplementary-transmission time-frequency resource is determined according to the re-allocated time-frequency resource.

17. The apparatus according to claim 16, wherein the transmission unit is further configured to transmit a resource indication indicating the re-allocated time-frequency resource and the supplementary-transmission time-frequency resource.

18. The apparatus according to claim 17, wherein the transmission unit is configured to:

transmit a first resource indication explicitly indicating the re-allocated time-frequency resource, wherein the first resource indication implicitly indicates the supplementary-transmission time-frequency resource; or transmit a second resource indication explicitly indicating the supplementary-transmission time-frequency resource, wherein the second resource indication implicitly indicates the re-allocated time-frequency resource.

19. The apparatus according to claim 16, wherein:
a frequency-domain relative start location $K_{s+t}$ of the supplementary-transmission time-frequency resource in the second time-frequency resource is the same as a frequency-domain relative start location $K_s$ of the re-allocated time-frequency resource in the first time-frequency resource; or a time-domain relative start location $L_{s+t}$ of the supplementary-transmission time-frequency resource in the second time-frequency resource is the same as a time-domain relative start location $L_s$ of the re-allocated time-frequency resource in the first time-frequency resource.

20. The apparatus according to claim 16, wherein:
there is an offset $\Delta k$ between a frequency-domain relative start location of the supplementary-transmission time-frequency resource in the second time-frequency resource and a frequency-domain relative start location of the re-allocated time-frequency resource in the first time-frequency resource; or there is an offset $\Delta l$ between a time-domain relative start location of the supplementary-transmission time-frequency resource in the second time-frequency resource and a time-domain relative start location of the re-allocated time-frequency resource in the first time-frequency resource, wherein $\Delta k \neq 0$ or $\Delta l \neq 0$.

* * * * *

UNITED STATES PATENT AND TRADEMARK OFFICE
CERTIFICATE OF CORRECTION

PATENT NO.        : 10,834,737 B2
APPLICATION NO.   : 16/460804
DATED             : November 10, 2020
INVENTOR(S)       : Dong et al.

Page 1 of 1

It is certified that error appears in the above-identified patent and that said Letters Patent is hereby corrected as shown below:

In the Claims

In Column 28, Line 54, Claim 11, delete "Ks" and insert --$K_s$--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*